United States Patent [19]
Lin

[11] Patent Number: 5,370,913
[45] Date of Patent: Dec. 6, 1994

[54] LAMINATED ORNAMENTAL GLASS ARTICLE

[76] Inventor: Chii-Hsiung Lin, No. 55, Dai Jen Street, Kaohsiung, Taiwan, Taiwan, Prov. of China

[21] Appl. No.: 966,480

[22] Filed: Oct. 26, 1992

[51] Int. Cl.⁵ .............................................. B32B 17/06
[52] U.S. Cl. .................................... 428/13; 428/34; 428/187; 428/195; 428/201; 428/210; 428/334; 428/336; 428/415; 428/417; 428/426; 428/430; 428/432; 428/437
[58] Field of Search ................... 428/13, 187, 195, 34, 428/426, 430, 432, 415, 417, 201, 210, 437, 701, 334, 336; 52/596, 306, 307

[56] References Cited

U.S. PATENT DOCUMENTS

| | | | |
|---|---|---|---|
| 3,364,090 | 1/1968 | Slipp | 428/187 |
| 3,573,156 | 12/1968 | Reilly | 52/307 |
| 4,124,733 | 11/1978 | Melling | 428/410 |
| 4,382,995 | 5/1983 | Lin | 428/432 |
| 4,600,627 | 7/1986 | Honda | 428/210 |
| 4,629,638 | 12/1986 | Nilsson | 428/187 |
| 4,767,676 | 8/1988 | Swarovski | 428/34.4 |

*Primary Examiner*—Ellis P. Robinson
*Assistant Examiner*—Timothy M. Speer
*Attorney, Agent, or Firm*—Lowe, Price, LeBlanc & Becker

[57] ABSTRACT

A laminated ornamental glass article has two transparent glass substrates and three coating layers of opaque figures and crevices between the two transparent glass substrates. This allows a person at one side of the glass article to see through the glass article an object at the opposite side of the glass article, while another person on the opposite side may only see the opaque figures on the glass article. The three coating layers include a glaze figure layer, a white paint layer and a dark, ink layer. Each layer has the same figure patterns and the same crevices, the crevices being adapted to be filled with an adhesive material for bonding the two transparent glass substrates.

4 Claims, 4 Drawing Sheets

BLANK SHEET TO BE REPLACED WITH COLOR INSERT

BLANK SHEET
TO BE REPLACED
WITH COLOR INSERT

LAMINATED ORNAMENTAL GLASS ARTICLE

FIELD OF THE INVENTION

This invention relates to a laminated safety ornamental glass which can be used as inlaid material for forming structures such as interior partitions, screen walls, walls, interior decorations or furniture. More particularly, this invention provides a laminated safety ornamental glass which can be used indoors and outdoors, whereas conventional ornamental glass is suitable primarily for indoor use.

BACKGROUND OF THE PRIOR ART

As living standards are improved and raised, people are paying more attention to the outer walls of the building, windows and doors as well as to interior decorations, furniture, partitions, and the like. The appearances of such items are much emphasized in various aspects, such as luminosity, safety, privacy and design.

Conventionally, ornamental glass is employed in interior partitions such as screens or inlaid into a wall for indoor use only. Such ornamental glass can be prepared by: (1) printing desired glazed pattern directly on a sheet of glass; (2) laminating the glass with an adhesive sheet of resin film with desired glazed pattern printed thereon in advance; (3) placing a resin film with a desired glazed pattern and an adhesive between two sheets of glass substrates, and laminating them under heat and pressure into a laminated ornamental glass plate. Such methods of producing the ornamental glass require a laminating curing treatment under heat and pressure, a printing technique for printing glaze patterns on a resin film or glass-laminating skills to obtain the desired delicate glazed pattern and a bubble-free ornamental glass article. The cost of production of such an article is generally high. The laminated glass article generally also needs further special rim-sealing treatment prior to its practical application and the laminate structure which is composed of different materials is apt to fall apart as room temperature and humidity vary. In such a structure with a single sheet of glass, the glazed painting pattern printed on one of the surfaces is exposed to the air and is therefore subject to sunlight or oxidization, so its colors will change and fade. The affected pattern can be further damaged when subjected to cleaning. Therefore, the ornamental glass obtained by conventional methods will not be durable. Aside from the above-mentioned disadvantages the material of the glazed painting patterns printed on conventional ornamental glass plates includes opaque glaze pigment, paint, oil ink or a mixture thereof, which after a period of time will fade away while being exposed to sunshine (infrared ray or ultraviolet rays), so such ornamental glass plates can be used indoors only. This explains why to date no ornamental glass plates for outdoor use is available.

SUMMARY OF THE INVENTION

It is a principal object of this invention to provide a laminated ornamental glass article which can be used both indoors and outdoors. It may be used not only as an interior partition, screen wall or wall ornamental inlaid plate, but also as an outer wall of a building, a curtain wall of a construction or as the glass portion of doors and windows which are transparent and heat-insulating under different lighting conditions.

Another object of the present invention is to provide a laminated ornamental glass composed of two sheets of transparent or light-colored, flat or bent, reinforced glass or ion exchange reinforced glass in which one of two sheets comprises a polyester or polycarbonate resin.

A further object of the present invention is to provide a luminous, transparent and heat-insulating laminated ornamental glass article, which can be produced by directly printing a glazed painting or intercrossing stripes or a net-like configuration composed of circle or hexagon patterns produced by screen printing on the inner surface of the outward-facing glass substrate. A second white paint coating layer is formed over the first layer, followed by a third layer of black or gray oil ink coating in turn printed or coated with the same patterns (circles or hexagons) over the second coating layer. Each coating layer contains figures having crevices. Therefore, the transparency and indoor luminosity can be optionally adjusted to the desired degree by changing the ratio of the sizes of the intercrossing stripes or net figure coating portion to the creviced portion without coating thereon to allow passage of light.

Still another object of this invention is to provide a laminated safety ornamental glass in which the adhesive employed for bonding the sheets may be admixed with infrared or ultraviolet absorbents for absorbing infrared rays or ultraviolet rays to provide a heat-insulation effect. Alternatively, embedded metallic wires or a net may be provided, making it theft-proof or explosion-proof. The glass may also be thickened as desired to increase penetration resistance, high crack resistance, and better sound insulation.

An even further object of this invention is to provide a laminated ornamental glass, which can be used indoors or outdoors, without the need for a high level of printing or glass-laminating techniques. In other words, three coating layers can be readily formed on an ornamental glass substrate simply by a conventional screen printing method. Therefore, the laminated ornamental glass is easy to produce at a high production rate with low defect level.

According to the present invention, a laminated ornamental glass article is obtained by: first forming a first coating layer on one surface of a first glass sheet substrate, by printing thereon desired glaze figures such as intercrossing stripes or a pattern of a net-like configuration composed of circle or hexagon patterns by conventional screen printing; then applying a second white paint coating layer of the same figures over the first coating layer; and then applying a third, black or gray ink coating layer of the same figures over the second coating layer. The first glass sheet substrate is adapted to face to the outside of a room for which the laminated ornamental glass article is to be used as a partition wall or a window glass. A second glass sheet substrate, which is adapted to face to the inside of the room, is then bonded over the third coating layer with an adhesive.

The figures of each coating layer contain a crevice portion. The crevice portion, which is free from coating material, is filled with the adhesive in the process bonding the second glass sheet substrate the first substrate. The first coating layer having intercrossing stripes or a net configuration composed of circular or hexagonal patterns is thus formed on the inner surface the first (outward-facing) glass substrate; the second white paint coating layer is disposed between the first coating layer and the third, black or gray ink coating layer; and hence only the figures of the coating layers, rather than indoor objects, can be seen when viewed from the outside of the building or the room. However, the figures of the third, black or gray oily ink coating layer, which is composed of the patterns of circles or hexagons, can be seen when viewed from the inside of the room; and, at the same time, outdoor objects can also be seen through the coating-free crevice portion when viewed from the inside of the building or the room. Therefore, it is a primary feature of this invention that the interior luminosity is adjustable simply by changing the ratio of the sizes of the opaque coating patterns to the coating-free transparent crevice portion. For example, make this ratio 9:1, 6.5:3.5, or 5:5, depending on the need to raise the rate of transparency from 3% to 65%, the outdoor prospect or vision can be seen more clearly through the transparent intercrossing-striped or netted crevice portion.

In addition to the above feature, the glazed painting, white paint and oil ink employed for the opaque coating layers of the present invention are primarily prepared by mixing conventional ceramic color frit such as CaO, MnO, CdS, $Cr_2O_3$ or $Fe_2O_3$ in a range 15 to 70 by weight with glass powder in a range 30 to 85% by weight (the weight percentage being based on the total weight of the mixture obtained therefrom). The content of the ceramic color frit is preferably no more than 30 by weight and that of the glass powder is no less than 30% by weight so that the adhesive force can be secured against deterioration and to ensure sufficient coloration ability of the opaque material. The oily ink is selected from a group of materials consisting of polyvinyl butyryl resin, urethane resin and methyl acrylate resin or a mixture thereof. The thickness of each coating layer ranges from 0.04 mm. to 0.18 mm., so the coating layers will not face under sunshine when heat-resistant ceramic color frit is used.

The laminated ornamental glass thus obtained may therefore be used not only as a glass with elegant and delicate colored patterns for outward-facing windows or curtain walls of buildings but also as the ornamental inlaid material for outer walls of buildings. In addition, no duplicated virtual images or distorted static images can be seen on the surface of the ornamental glass in which the intermediate coating layers are of opaque materials according to this invention. The intermediate coating layers may thus be thickened up to about 50 mm. without occurrence of the above-mentioned problems. It also means that the laminated ornamental glass of the present invention can be made 30% safer than conventional single sheet glass of the same thickness as the laminated glass sheets of this invention. The penetration resistance, high net crack, sound insulation, and heat insulation will approach 100% while its thickness is up to 50 mm. Moreover, the adhesive used in this invention can be further admixed with infrared or ultraviolet absorbents to absorb infrared rays or ultraviolet rays from outdoors, or embedded with steel wires or nets to make the glass become explosion-proof and theft-proof.

This present invention will be described in detail with reference to the following drawing and description of its embodiments. These are intended to be illustrative but not limiting, and various modifications, alternatives, and improvements should become apparent to those skilled in the art without departing from the spirit and scope of the invention.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 6(a) is a glazed painting view of the laminated ornamental glass of this invention with patterns composed of circles employed as a part of an interior window when viewed from inside a room;

FIG. 6(b) is a view from the opposite side as the view of FIG. 6(a), and shows outside objects being clearly seen through crevice portions without a coating of glass.

FIG. 7(a) shows the same glazed painting view as in FIG. 6(a) except that hexagon patterns are used instead of circle patterns.

FIG. 7(b) shows a view from the opposite side as the view of FIG. 7(a).

DETAILED DESCRIPTION OF THE PREFERRED EMBODIMENTS

Figure 1:
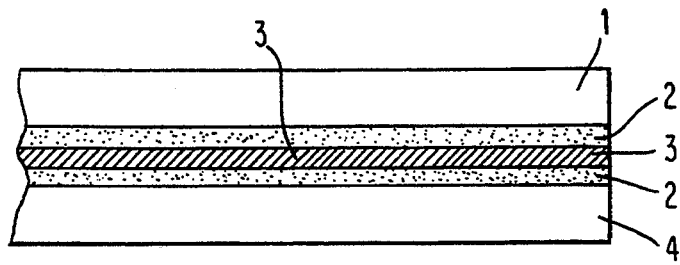
FIG. 1 is a cross-sectional view of the structure a conventional laminated ornamental glass.

As best seen in FIG. 1, a conventional laminated ornamental glass is composed of a sheet of outward facing transparent or light-colored plate glass substrate 1; two layers of resin adhesive 2; a layer of resin film or paper 3 with glazed painting or stripe figures printed or coated thereon, which is positioned between the two adhesive layers 2; and a sheet of inward-facing transparent or dark-colored heat ray absorbing plate glass substrate 4. It is thus known according to FIG. 1 that the glazed painting or striped-figure patterns of the conventional laminated ornamental glass are simply printed or coated on an intermediate layer of a resin film or paper and then the patterned layer 3 is laminated between the plate glass substrates 1 and 4. Therefore, the ornamental glass thus obtained is not transparent and can not be seen through. It can therefore be used only for interior partitions or as an inlaid material for inner walls of buildings rather than being used as the inlaid material for outer walls or as glass for outward-facing windows or curtain walls of buildings.

As best seen in FIG. 2 to FIG. 5, which depict the laminated structure according to this invention, 1 is an outward-facing transparent or bent plate glass substrate which is selected from sodium calcium silicates reinforced glass with or without heat treatment or sodium, potassium ion exchange reinforced glass. 2 is an adhesive layer formed with a conventional transparent adhesive which is selected from a group of adhesives consisting of polyvinyl butyryl resin adhesive, polyester resin adhesive, methyl acrylate resin adhesive, urethane resin adhesive, two-component epoxy resin adhesive, one-component ultraviolet-sensitized curing adhesive, and a one-component heating curing adhesive. 3, 5, and 6 are respective coating layers each having intercrossing stripes of a net-like configuration composed of circle or hexagon patterns, which are directly printed in an overlapping manner by a conventional screen printing on the inner surface of the transparent plate glass substrate 1. 3 is a glaze painting or striped-figure coating layer. 5 is a white coating layer; and 6 is an ink coating layer. 4 is an inward-facing, transparent, light-colored, or bent plate glass substrate which may be replaced by polyester or polycarbonate resin plate depending upon the desired use and need. 2' stands for a transparent crevice portion in the striped-figure. It is coating the opaque patterned coating layers and is filled with adhesive material forming layer 2.

Figure 2:
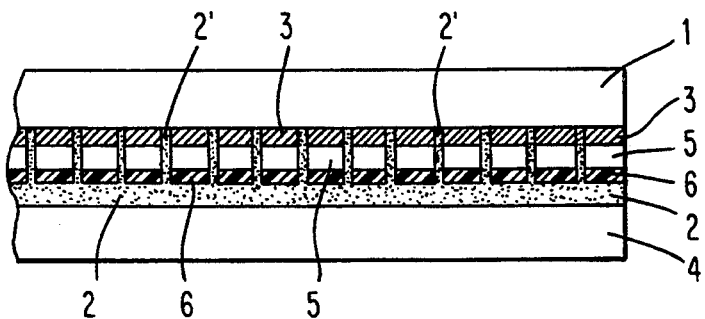
FIG. 2 is an enlarged cross-sectional view of the structure of a preferred embodiment of the present invention.
Figure 3:
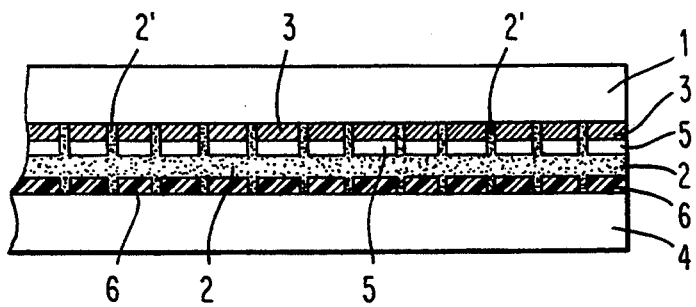
FIG. 3 is an enlarged cross-sectional view of the structure of another embodiment of the present invention.
Figure 4:
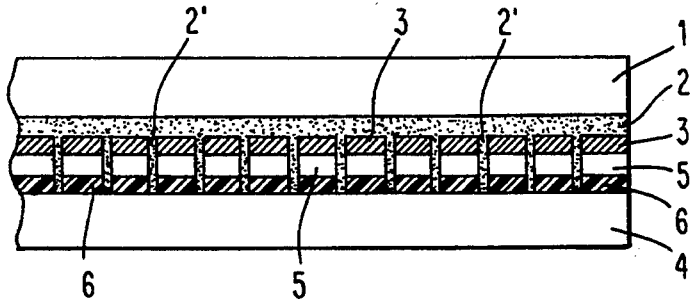
FIG. 4 is an enlarged cross-sectional view of the structure of a further embodiment of the present invention.
Figure 5A:
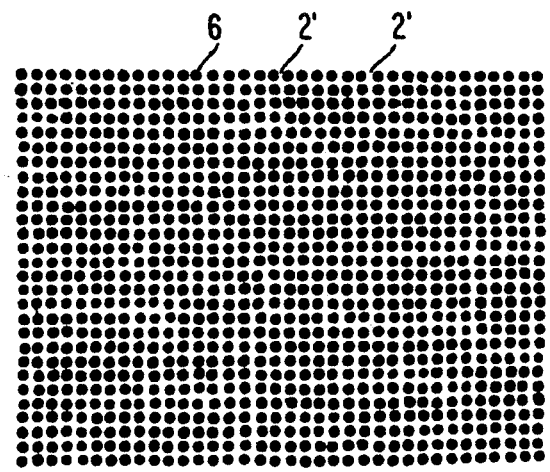
FIG. 5(a) is a perspective view of patterns composed of circles employed in this invention when viewed from inside a room.
Figure 5B:
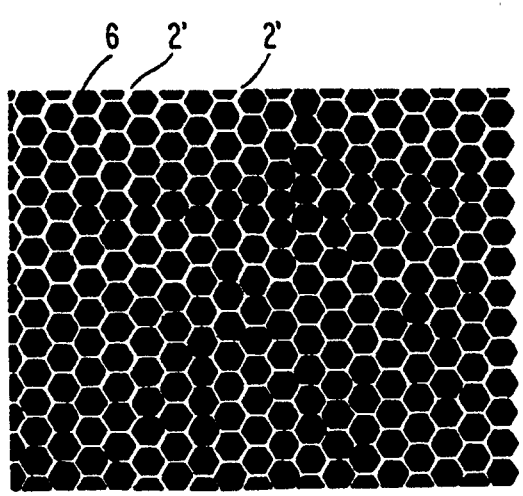
FIG. 5(b) is a perspective view of patterns composed of hexagons employed in this invention when viewed from inside a room.

FIG. 2 shows an embodiment wherein adhesive layer 2 is disposed between third coating layer 6 and the inward-facing glass substrate 4. However, as an alternative, the third coating layer 6 may be formed directly on the inward-facing glass substrate 4, and adhesive layer 2 may be disposed between the second and third coating layers 5 and 6 as shown in FIG. 3. Adhesive layer 2 may be otherwise disposed between the outward-facing glass substrate 1 and first coating layer 3 as shown in FIG. 4.

The novelty of the present invention is best understood from FIG. 6 and FIG. 7. FIG. 6(a) and FIG. 7(a) both show that no indoor objects but only a glazed marble pattern painting is seen when viewed from the outside. The aforementioned coating-free crevice portion, which is seen to be like intercrossing stripes, also obscurely appears on the outward-facing surface of the laminated glass. By contrast, outdoor objects may be clearly seen through the coating-free crevice portion of the laminated ornamental glass of the invention when viewed from the inside.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A laminated ornamental glass article, comprising:
   a) a first transparent plate glass substrate;
   b) a first coating layer having glaze opaque figures composed of a selected pattern consisting of circles or hexagons, applied on one side of said first transparent plate glass substrate, the pattern having crevice portions;
   c) a second, white paint coating layer formed on said first coating layer, the second layer having pattern and crevice portions that are the same as the pattern and crevice portions of the first coating layer;
   d) a third coating layer, consisting of one of black or gray oil ink formed on said second coating layer, the third coating layer having pattern and crevice portions that are the same as the pattern and crevice portions of the first and second coating layers; and
   e) a second transparent plate glass adhered on to said third coating layer with a transparent adhesive material filled in said crevice portion, wherein each of said first, second and third coating layers has a thickness ranging from 0.04 mm to 0.18 mm.

2. A laminated ornamental glass article according to claim 1, wherein:
   respective materials for forming said glaze opaque figures, said white paint and black or gray oil ink, each comprise 15% to 70% by weight of a corresponding ceramic color frit and 30% to 85% by weight of a glass powder, the weight percentages being based on a total weight of the all of said materials.

3. A laminated ornamental glass article according to claim 1, wherein:
   each of said first, second and third coating layers has a ratio of total area of the selected pattern to total area of corresponding crevice portions in a range from 9:1 to 1:1.

4. A laminated ornamental glass article according to claim 2, wherein:
   each of said first, second and third coating layers has a ratio of total area of the selected pattern to total area of corresponding crevice portions in a range from 9:1 to 1:1.

* * * * *